(12) United States Patent
Ringdahl

(10) Patent No.: US 6,629,344 B2
(45) Date of Patent: Oct. 7, 2003

(54) METHOD FOR MAKING IMPREGNATED ELECTRICAL COMPONENTS

(75) Inventor: Lennart Ringdahl, Ljungbyholm (SE)

(73) Assignee: Evox Rifa AB, Kalmar (SE)

( * ) Notice: Subject to any disclaimer, the term of this patent is extended or adjusted under 35 U.S.C. 154(b) by 0 days.

(21) Appl. No.: 09/843,744

(22) Filed: Apr. 30, 2001

(65) Prior Publication Data

US 2002/0184745 A1 Dec. 12, 2002

(51) Int. Cl.⁷ ............................................ H01G 7/00
(52) U.S. Cl. ..................... 29/25.42; 29/729; 29/743
(58) Field of Search ......................... 29/25.42, 729, 29/743; 264/101, 102; 427/201–206, 294

(56) References Cited

U.S. PATENT DOCUMENTS

| | | | |
|---|---|---|---|
| 3,914,467 A | | 10/1975 | Akao et al. |
| 3,979,530 A | * | 9/1976 | Schwider et al. ............ 264/102 |
| 4,472,482 A | | 9/1984 | Sato et al. |
| 4,681,718 A | | 7/1987 | Oldham |
| 5,157,820 A | | 10/1992 | Frederick ..................... 29/25.42 |
| 5,670,203 A | * | 9/1997 | Terhardt et al. ............ 118/50.1 |
| 6,214,284 B1 | * | 4/2001 | Soudarev et al. .............. 164/98 |

FOREIGN PATENT DOCUMENTS

| | | |
|---|---|---|
| DE | 2 210 024 | 8/1973 |
| DE | 30 03 089 | 8/1980 |
| EP | 0 295 669 | 12/1988 |

* cited by examiner

Primary Examiner—Timothy L. Maust
(74) Attorney, Agent, or Firm—Young & Thompson

(57) ABSTRACT

A method for preparing an impregnated electrical component such as windings or stacks for capacitors, coils etc. includes the step of subjecting the component in an impregnating step to an impregnating thermo-hardening agent, and thereafter in a curing step placing the component in a curing bath for curing the impregnating thermo-hardening agent present within the component.

16 Claims, 3 Drawing Sheets

Figure 1A:
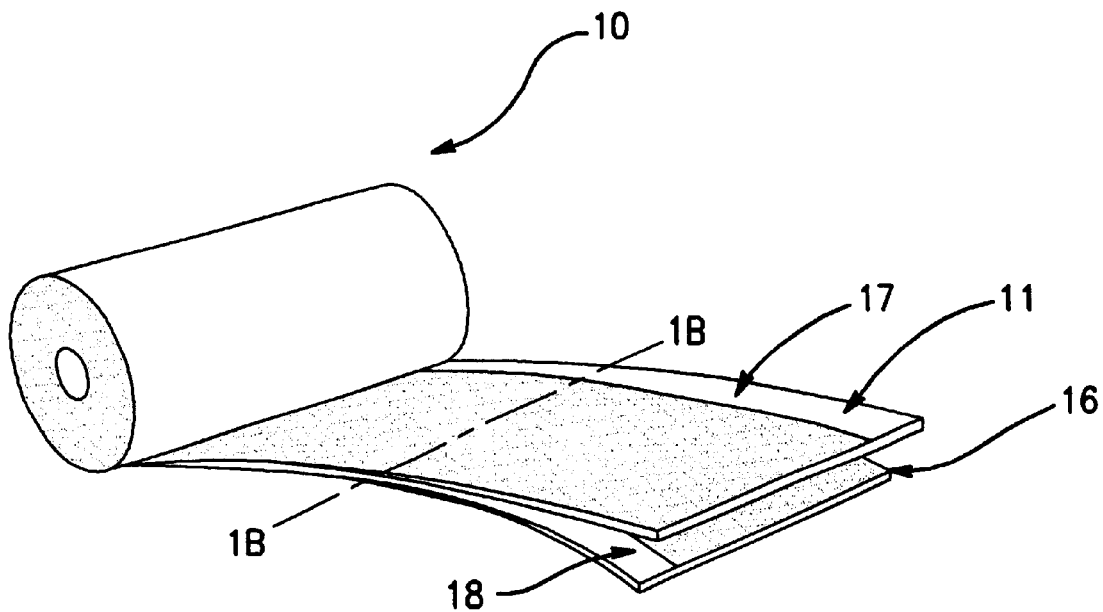

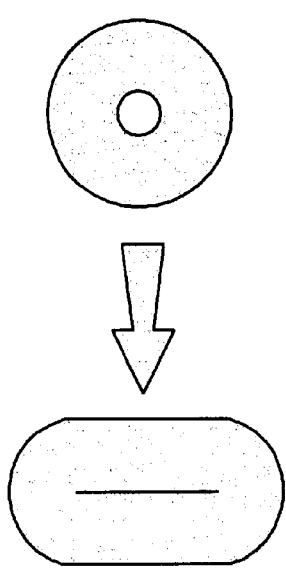
FIG. 2A
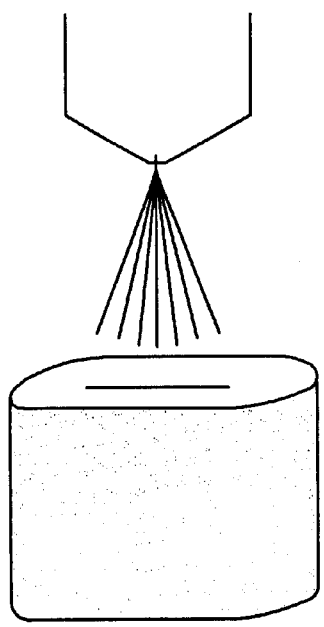
FIG. 2B
FIG. 2C
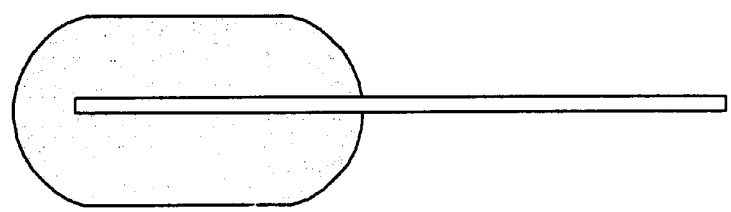
FIG. 2D
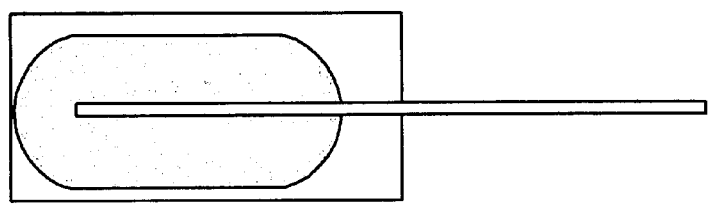

METHOD FOR MAKING IMPREGNATED
ELECTRICAL COMPONENTS

BACKGROUND OF THE INVENTION

The invention relates to film capacitors, stacked or wound, in particular metallized wound capacitors. The method of impregnating the windings may also be applied to coil and other electrical components.

Film capacitors are to be understood as relating to capacitors made from paper and/or plastic material. This expression includes both metallized constructions as well as film/foil constructions. The foil here denotes a metal foil, e.g. Al, Sn, SnPb, etc.

For the purpose of this document the expression "capacitor winding" also applies to "stacked capacitors", the expression impregnation relates to the impregnation of the winding as such, which is followed by an encapsulation. In the detailed description the invention will be described with reference to a wound film capacitor. This should, however, not be considered limiting the invention.

Wound capacitors are known within the art e.g. U.S. Pat. No. 4,656,556, EP, B1, 0 192 818, and DE, C1, 35 05 888. Such capacitors are e.g. wound from films that have been metallized. The metallization affords for the ends of the wound capacitor winding being metallized in order to form contacts on the capacitor. The films may be made from paper or plastic.

Paper has a drawback in that it is more porous and may have trap air in the pores. The usual procedure in manufacturing these capacitors is to dry the paper and thereafter impregnate it with e.g. epoxy in order to remove air from being trapped within the paper used in making the winding. Air may also be trapped within the winding itself between the different layers. Thus, when using plastic films instead of paper, air may still be trapped within the wound capacitor winding.

An often-felt need is to add self-extinguishing substances to the material forming the encapsulation of the capacitor. There are several substances like bromine, aluminum hydrate etc., which may be used for these purposes. However, some of these substances pose a problem when impregnating the capacitor winding since they hinder an effective impregnation to take place and substances like bromine is for environmental reason no good choice, thus they should not be used for the impregnating part of the manufacturing of the capacitor.

According to prior art paper capacitors are commonly prepared by winding paper, metallized or with thin metal foil, in two or more layers, into a winding. These windings may be provided with a vapor barrier at this stage by winding into the outer part of the winding a foil of suitable material. The windings, having a cylindrical form, are compressed into an essentially flat form and end-sprayed with or without leads or the like. It is important that the winding is sufficiently compressed such that no metal enters between the layers in the winding. The winding is dried thereafter and if the leads were not attached to the winding in the earlier step it is now soldered to the end-sprayed parts of the winding. The winding is mounted in a box or in a mould, and if no vapor barrier has been applied to the winding in the earlier stages the vapor barrier in the form of a label may be placed in the mould.

The mold or the box with the winding is subjected to vacuum and impregnation of the winding including filling the box or the mould is accomplished, using the same medium for impregnation and filling and doing this in one step. The box/mould and its contents are subjected to curing at this time and the finished capacitors are either pulled out of the mould or the boxes are separated. The capacitors are then of course tested and marked before packing the same.

In the case of windings being made from plastic material instead of paper, the filling of the boxes or moulds is done without applying a vacuum.

An overview of the manufacture of the capacitors according to the prior art is given in table I, column 1–3.

SUMMARY OF THE INVENTION

The invention concerns a new method for preparation of impregnated and encapsulated capacitors.

According to the invention the method of making the windings comprises a step in which it is ascertained that the air is removed from the finished winding and that the impregnating material is cured.

According to the invention it is also possible to impregnate the winding using one impregnating medium and thereafter encapsulating the same using another medium.

The winding is wound from metallised film, paper or plastic. The plastic film may e.g. comprise polypropen (PP), polyester (PET), polycarbonate (PC), polyphenylene sulphide (PPS), polyethylene naphtalate (PEN). The choice of film material is dependent on the intended use for the capacitor.

In the new method according to the invention a winding/stack is prepared. The winding is preferably placed under vacuum in order to remove the air and to impregnate the winding with e.g. epoxy, the vacuum is thereafter released and the air entering exerts a pressure on the epoxy, which thus is forced into the capacitor windings. The winding with the impregnating epoxy is cured in a curing bath and leads are fastened to the capacitor windings in order to provide for electrical connections for the capacitor. Thereafter the capacitor winding is preferably placed into box for the encapsulation with e.g. epoxy, whereafter the epoxy is cured. In this manner the impregnating agent used for the impregnation of the winding may be different from the material used for the encapsulation of the same.

It is an object of the present invention to provide an encapsulated, wound capacitor, paper or plastic, which can be manufactured in a simple and efficient manner.

It is further an object of the present invention to provide an encapsulated, wound capacitor, paper or plastic, which has an encapsulation, which provides self-extinguishing characteristics and shows strength and resistance towards common fluxing agents, and where the impregnation of the winding can be made using compounds more suitable from environmental reasons, than the compounds used hitherto.

It is also an object of the present invention to provide a winding for a capacitor, paper or plastic, which is easily and effectively impregnated and cured and where the impregnating agent is more acceptable from environmental reasons, than the compounds used hitherto.

It is further an object of the present invention to provide an encapsulated, wound capacitor, paper or plastic, in which the wound capacitor winding exhibits high voltage withstand capability, i.e. there should be no risk for short-circuits.

Metallized paper film provides one good characteristic over plastic film and that is the superior ability of self-healing not provided for by plastic films. Plastic film, however, film metallized with very thin metal layer exhibiting a high Ω/□ gives almost equivalent results in this respect.

Other objects, features and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE TABLE AND THE DRAWINGS.

Table I Shows an overview of procedures for making prior art capacitors and according to the invention.

Figure 1B:
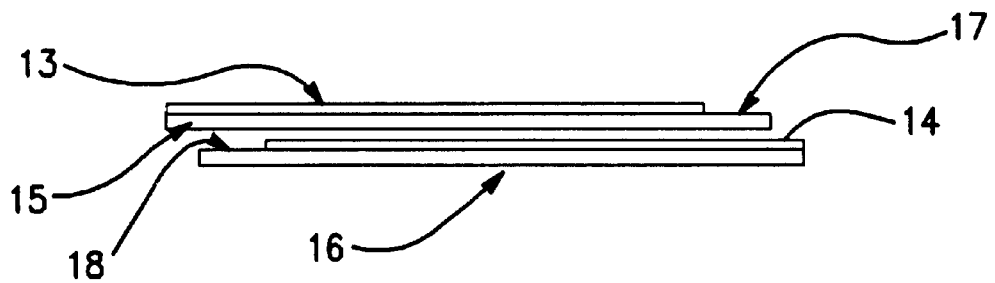

FIGS. 1(a)–(b) Winding for a metallized film capacitor.

FIGS. 2(a)–(d) The procedure of preparing the winding according to the invention.

Figure 3:
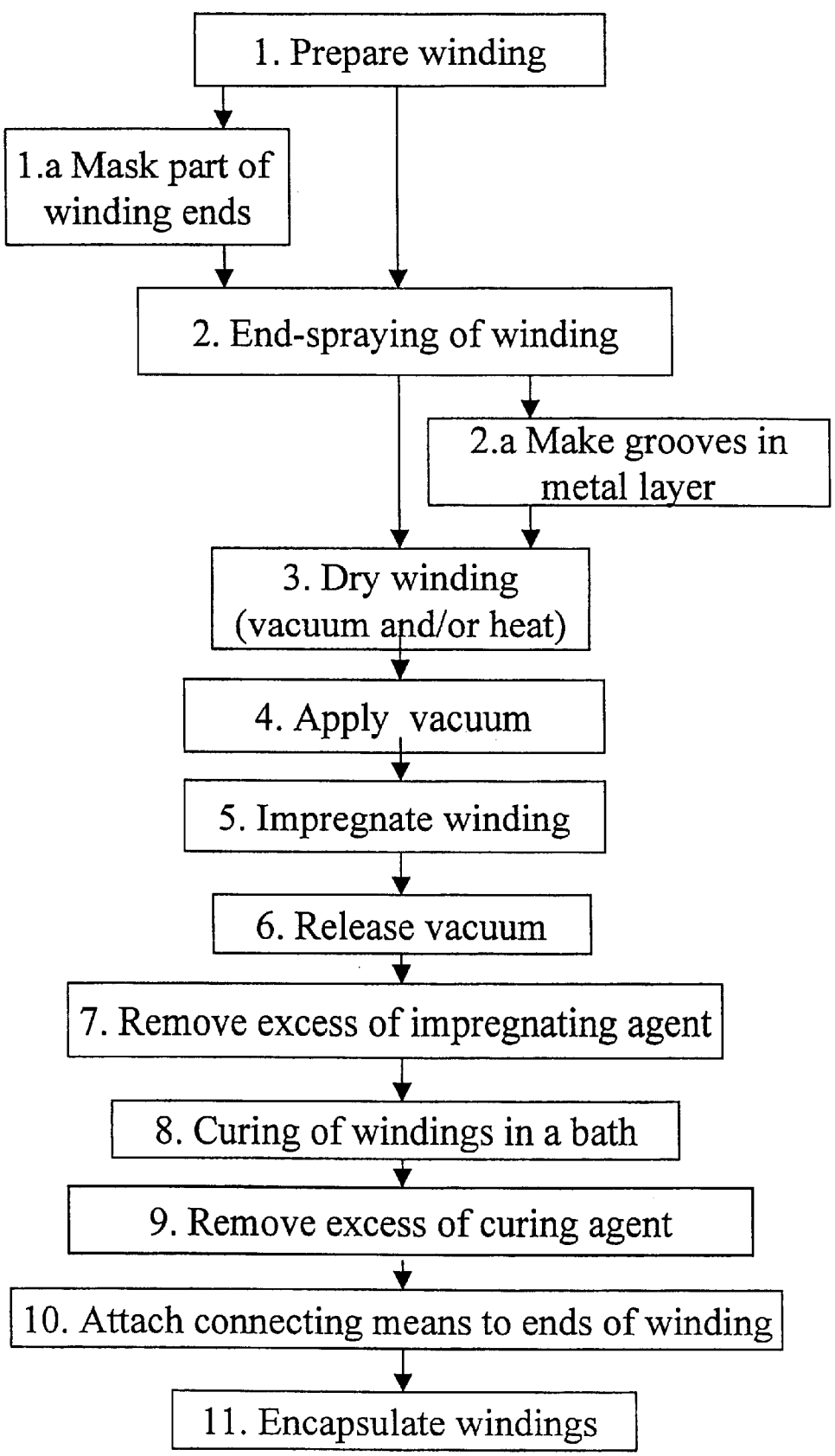

FIG. 3 Flow sheet over an exemplary preparation of a capacitor according to the invention.

In FIG. 1a is shown a schematic view of a metallized film capacitor of single design and in FIG. 1b a section along A—A. The partly wound winding 10 is shown with the two layers 11 and 12. As is shown in the section, the layers each comprise an electrode 13,14 and a dielectric 15,16 (paper or plastic). The layers 11 and 12 are placed on top of each other and rolled. Optionally extra layers are place in-between the two layers 11 and 12. The two layers 11, 12 are shown to have a free margin 17, 18 each on opposite sides of the two films. In this manner the electrodes 13,14 of each layer 11 and 12 may be separately contacted, one on each side, to provide for electrical connection of the capacitor.

FIGS. 2(a)–(d) show one way of giving the winding its final form. The view in FIG. 2(a) shows schematically a flattening of the winding. In FIG. 2(b) is shown how the ends of the winding are end-sprayed for contacting. According to the invention an impregnation follows this step.

The impregnation will be further explained below. In FIG. 2(c) is the attachment of a lead to one of the end portions of the winding illustrated, the other lead attached to the opposite end (not shown). Finally in FIG. 2(d) the encapsulation of the winding is illustrated.

A preferred embodiment of the method of manufacturing a wound capacitor according to the present invention is described below with reference to FIG. 3. In step 1 metallized films in the form of elongated strips (plastic or paper) are placed on top of each other, and thereafter wound into a cylinder form. The metallization of the strips is so arranged as to leave one border of the strip without metal and the other covered with metal. The metallized borders of the films are used to provide electrical connection between the electrodes and the leads by end-spraying the windings. Other means of electrical connectors could be substituted for the leads in electrically coupling of the capacitor to other electrical components. Depending on the type of capacitor made the layers of film may be more than two.

In step 1a the ends of the winding are partially masked in order to spray a thin metal-layer (approx. 0.4 mm) on the respective ends of the winding and still leave access to the winding for the impregnation agent.

In step 2 the ends of the windings are end-sprayed onto which the lead subsequently are to be welded.

An alternative route is to end-spray the ends in step 2 without masking any part thereof. In order to provide for the entry of the impregnation into the windings, grooves in the metallized ends are then made in step 2a to allow the impregnation to enter into the winding.

In a further embodiment the end-sprayed metal layer may be so thin and porous that access to the winding for the impregnating agent is given through the metal layer.

In step 3 the winding are preferably subjected to a drying process at approx. 110° C. for approx. 12 hours. This may be done under vacuum. The capacitor winding according to the invention is put thereafter under vacuum in step 4, in e.g. a vessel in which vacuum is pumped.

Meanwhile, in step 5, epoxy resin in liquid form is thoroughly out-gassed and in step 5 poured over the capacitor windings for impregnating the same. The temperature of the epoxy-bath resulting from this is kept at e.g. 60–70° C.

In step 6 the vacuum is released and the pressure of the in-flowing air is allowed to exert its action on the impregnated winding for e.g. half an hour. The duration of this period is within the experimental skills of the man skilled in the art to decide on, and depending on such as the size of the winding, the material, the impregnating agent, etc.

This period allows for the air to press the epoxy resin into the capacitor winding and to permeate the possible voids

TABLE I

| Paper capacitors I | Paper capacitors II | Plastic capacitors | Capacitor acc. to the invention |
|---|---|---|---|
| 1. Prepare winding | 1. Prepare winding incl. humidity barrier | 1. Prepare winding | 1. Prepare winding. optionally incl. humidity barrier |
| 2. Compress the winding | 2. Compress the winding | 2. Compress the winding | 2. Compress the winding |
| 3. End-spray winding, attach leads. | 3. End-spray winding (no leads) | 3. End-spray winding (no leads) | 3. End-spray winding (masking alt. provide groves in the metal layer |
| 4. Drying | 4. Drying | 4. Drying, optional | 4. Drying, (Vaccuum and/or heat) |
| 5. Mount winding in mould with humidity barrier | 5. Attach Leads | 5. Attach leads (alt. surface-mounting-device means). | 5. Impregnation of winding: Vaccuum, impregnation, centrifuging, curing in curing bath, centrifuging |
| 6. Impregnate under vacuum and cure | 6. Mount winding in box | 6. Mount winding in box | 6. Attach leads (alt. surface-mounting-device means) |
| 7. Remove winding from mould | 7. Impregnate under vacuum and cure | 7. Filling (no vacuum) of the void between the box and the winding | 7. Mount winding in box |
| 8. Test finished product | 8. Separate boxes (winding remains in box) | 8. Cure | 8. Filling (no vaccuum) of the void between the box and the winding |
| | 9. Test and mark finished product | 9. Test and marked finished product | 9. Cure |
| | | | 10. Test and mark finished product | within the capacitor winding, both within the films and between the films, such that essentially no air will be present therein. Thus the impregnating substance should have a low viscosity of preferably 20 mPa.s at 60–70° C. in order to accomplish the object. Examples of epoxy used are e.g. bisphenol-A diglycidylether or a mixture of bisphenol-A and bisphenol-F. The impregnating agent may also comprise one or more curing agents and accelerators.

In the event of partial impregnation of the windings the impregnation may be performed without the application of vacuum since the capillary forces will tend to fill the winding with enough impregnating agent.

After this treatment the capacitor windings exhibit epoxy within and also on the outside of the windings. The windings may in step 7, e.g. be centrifuged in order to dispel the excess epoxy, however this is not always necessary. Other means of dispelling or removing the excess epoxy are within the scope of this invention.

In order to cure the impregnating epoxy within the capacitor windings, they are, in step 8, placed in a warm liquid bath for curing at a temperature of approx. 90 to 150° C. Several objects are achieved by using this measure. The curing bath provides an even temperature for the curing, surplus epoxy, still sticking to the windings, may be removed from the capacitor windings by the action of the liquid curing bath and also the liquid curing bath prevents the capacitor windings from sticking together.

Use of the liquid for curing provides further advantages, since in this manner many windings may be cured in each batch. In the event of any minute amount of epoxy missing it is possible for the liquid to substitute and thus keep any air outside the ready-made capacitor winding.

During the curing of the impregnated windings in the bath, the bath may be slowly stirred or agitated in order to further the curing process.

In case the capacitor windings should be cured in air, as in the prior art, they would have to be tumbled during the curing so as not to stick to each other. Also curing of the epoxy treated winding in air will give a thin layer of epoxy on the ends of the windings which makes the attachment of the contacting means, e.g. leads difficult. If the windings are small they may stick together in spite of the tumbling.

Different types of curing liquids may be used according to the invention in the curing of the capacitor windings or coils. One such curing liquid is an oil, DINP, but other oils commonly used for impregnation of capacitors or coils may be used as well. The important characteristics of the curing liquids to be used are good electrical properties, which means that they should provide good isolating and dielectric characteristics.

In step 10 the windings are provided with the contacting means, leads or connection means for surface mounted devices.

The windings are thereafter, in step 11, encapsulated using a suitable compound or composition, which in a preferred form of the invention is a different compound than the one used for impregnation of the windings. The impregnation agent must not necessarily be self-extinguishing. If a moisture barrier is needed the barrier may, in an earlier step, be interleaved in the outer part of the winding before encapsulation, or the winding may placed in a box into which a moisture barrier layer is provided, or the box itself may comprise a moisture barrier.

In a further embodiment of the capacitor according to the invention metal foils interleaved with the paper or plastic films may substitute the metallized films. In this embodiment the impregnation and thereafter following curing in a liquid bath for curing becomes even more important in order to arrive at a good result.

The capacitor according to the invention may also be provided with other contacting means than leads but may e.g. be provided with surface metallized contact areas on the winding directly in order to afford surface mounting on e.g. a substrate. The mounted winding may thereafter be encapsulated if necessary for ambient reasons.

One benefit of the method according to the invention is that it may be applied to windings made from paper and/or plastic. Once the paper windings are impregnated and cured they may be treated in the same manner as plastic windings having gone through the same treatment or non-impregnated plastic windings. This means that from production point of view, the windings, paper or plastic based, can be made into capacitors using the same measures and apparatuses. They may both be encapsulated using e.g. epoxy without having to add the compounds containing bromine etc. needed in the production of paper capacitors for self-extinguishing purposes.

Instead of epoxy other thermosetting resins, such as polyester, polyurethane etc., may be used for encapsulation. Filling agents, e.g. aluminum hydrate, may be added to the encapsulation compound/ composition in order to achieve special characteristics as to self-extinguishing purposes and fissuring.

What is claimed is:

1. A method for preparing an impregnated electrical component, the method comprising the steps of:
    subjecting the component in an impregnating step to an impregnating thermohardening agent, and thereafter in a curing step placing said component in a curing bath for curing the impregnating thermohardening agent present within said component, and
    providing said electrical component by winding metallized films into windings or stacking metallized films into stacks with other substantially identical metallized films, said films comprising paper and/or plastic material carrying on at least one surface a metal layer,
    optionally end-spraying, at least partly, the ends of said windings or two sides of said stacks,
    before said impregnation, such that access to the interior of the component for the impregnating agent is provided.

2. Method according to claim 1, in which the impregnation step is performed under vacuum, said step comprising feeding said impregnating thermohardening agent onto said electrical component, forming a bath covering said component, while essentially maintaining vacuum in said vacuum chamber, and thereafter releasing said vacuum.

3. Method according to claim 1, in which said impregnating thermohardening agent is degassed before subjecting said component to it.

4. Method according to claim 1, in which said impregnating thermohardening agent is an epoxy comprising a hardener and an accelerator and that the temperature of said epoxy during the impregnation step is kept at approximately 60–70° C. during approximately 30 minutes.

5. Method according to claim 1, in which said impregnating thermohardening agent is a polyester compound and the temperature of the polyester during impregnation step is kept at approximately 60–70° C. during approximately 30 minutes.

6. Method according to claim 1, characterized in that said electrical component after impregnation is subjected to a centrifuging action for removal of excess impregnating agent.

7. Method according to claim 1, characterized in that said electrical component after impregnation is subjected to cleaning in a solvent.

8. Method according to claim 1, characterized in that temperature of the curing bath is kept at approximately 90–150° C. and that the time for curing is approximately 2–12 hours.

9. Method according to claim 8 characterized in that said electrical component after curing is subjected to a centrifuging action for removal of excess curing agent.

10. Method according to claim 8 characterized in that said electrical component after curing is subjected to cleaning in a solvent.

11. Method for making a capacitor according to claim 1 further comprising the steps of providing contact means in contact with the two end-sprayed ends of said windings or the two ends of said stacks and encapsulating said windings or stacks.

12. Method for making a capacitor according to claim 1 further characterized in that the encapsulation agent is a thermosetting resin, e.g. epoxy, or polyester or polyurethane.

13. A method for preparing an impregnated electrical component, the method comprising the steps of:

subjecting the component in an impregnating step to an impregnating thermohardening agent, and thereafter in a curing step placing said component in a curing bath for curing the impregnating thermohardening agent present within said component, and providing said electrical component by winding films interleaved with metal foil into windings or stacking said films interleaved with metal foil into stacks with other substantially identical films, said films comprising paper or plastic material, optionally end-spraying, at least partly, the ends of said windings or two sides of said stacks, before said impregnation, such that access to the interior of the component for the impregnating agent is provided.

14. Method according to claim 13, characterized in that said component is subjected to a drying step before said impregnation step.

15. Method for making a capacitor according to claim 13, further comprising the steps of providing contact means in contact with two end-sprayed ends of said windings or the two ends of said stacks and encapsulating said windings or stacks.

16. Method for making a capacitor according to claim 13, further characterized in that the encapsulation agent is a thermosetting resin.

* * * * *